United States Patent

Fainstain

(10) Patent No.: US 7,868,928 B2
(45) Date of Patent: Jan. 11, 2011

(54) LOW NOISE COLOR CORRECTION MATRIX FUNCTION IN DIGITAL IMAGE CAPTURE SYSTEMS AND METHODS

(75) Inventor: Eugene Fainstain, Netania (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 842 days.

(21) Appl. No.: 11/686,632

(22) Filed: Mar. 15, 2007

(65) Prior Publication Data

US 2007/0263264 A1 Nov. 15, 2007

Related U.S. Application Data

(60) Provisional application No. 60/782,502, filed on Mar. 15, 2006.

(51) Int. Cl.
*H04N 9/73* (2006.01)
*G06K 9/00* (2006.01)

(52) U.S. Cl. .................. 348/223.1; 382/162

(58) Field of Classification Search .......... 348/223.1; 358/515
See application file for complete search history.

(56) References Cited

U.S. PATENT DOCUMENTS

| | | | |
|---|---|---|---|
| 3,919,468 A | 11/1975 | Weimer | |
| 4,471,228 A | 9/1984 | Nishizawa et al. | |
| 5,461,425 A | 10/1995 | Fowler et al. | |
| 5,541,654 A | 7/1996 | Roberts | |
| 5,572,074 A | 11/1996 | Standley | |
| 5,638,135 A * | 6/1997 | Mukai | 348/642 |
| 5,694,495 A | 12/1997 | Hara et al. | |
| 5,742,659 A | 4/1998 | Atac et al. | |
| 5,841,126 A | 11/1998 | Fossum et al. | |
| 5,898,168 A | 4/1999 | Gowda et al. | |
| 5,900,623 A | 5/1999 | Tsang et al. | |
| 5,920,656 A | 7/1999 | Gahang | |
| 5,949,483 A | 9/1999 | Fossum et al. | |
| 5,962,844 A | 10/1999 | Merrill et al. | |
| 6,008,511 A | 12/1999 | Tokumitsu et al. | |
| 6,011,870 A | 1/2000 | Jeng et al. | |

(Continued)

FOREIGN PATENT DOCUMENTS

WO WO 98/15116 A1 4/1998

OTHER PUBLICATIONS

Agranov, Gennadiy et al., Crosstalk and Microlens Study In A Color CMOS Image Sensor, IEEE Transactions On Electron Devices, vol. 50, No. 1, pp. 4-11, Jan. 2003.

(Continued)

*Primary Examiner*—Kelly L Jerabek
(74) *Attorney, Agent, or Firm*—Harness, Dickey & Pierce, P.L.C.

(57) ABSTRACT

An image processing system includes a filtering arrangement configured to receive incoming pixel information and filter at least a first portion of the information to thereby pass a second portion of the information for further processing; circuitry configured to apply a first color correction function to the incoming pixel information to thereby produce a modified first portion; circuitry configured to apply a second color correction function to the second portion to thereby produce a modified second portion; and an adder configured to combine the modified first portion to the modified second portion.

16 Claims, 2 Drawing Sheets

U.S. PATENT DOCUMENTS

| | | | |
|---|---|---|---|
| 6,046,444 | A | 4/2000 | Afghahi |
| 6,067,088 | A | 5/2000 | Tanioka et al. |
| 6,069,377 | A | 5/2000 | Prentice et al. |
| 6,118,482 | A | 9/2000 | Clark et al. |
| 6,122,406 | A | 9/2000 | Okubo |
| 6,166,367 | A | 12/2000 | Cho |
| 6,175,383 | B1 | 1/2001 | Yadid-Pecht et al. |
| 6,204,524 | B1 | 3/2001 | Rhodes |
| 6,243,434 | B1 | 6/2001 | Hynecek |
| 6,266,093 | B1 * | 7/2001 | Glenn ................ 348/448 |
| 6,350,663 | B1 | 2/2002 | Kopley et al. |
| 6,369,737 | B1 | 4/2002 | Yang et al. |
| 6,515,271 | B1 | 2/2003 | Shimizu |
| 6,515,699 | B2 * | 2/2003 | Tanji et al. ............ 348/254 |
| 6,518,640 | B2 | 2/2003 | Suzuki et al. |
| 6,690,049 | B2 | 2/2004 | Suzuki et al. |
| 6,697,110 | B1 * | 2/2004 | Jaspers et al. ......... 348/272 |
| 2003/0160883 | A1 | 8/2003 | Ariel et al. |
| 2004/0012692 | A1 | 1/2004 | Arazaki |
| 2004/0179114 | A1 | 9/2004 | Silsby et al. |
| 2004/0201724 | A1 * | 10/2004 | Kharitoneko et al. .... 348/223.1 |
| 2005/0068436 | A1 | 3/2005 | Fraenkel et al. |
| 2005/0128325 | A1 | 6/2005 | Fraenkel et al. |
| 2005/0225807 | A1 | 10/2005 | Fainstain et al. |
| 2005/0231620 | A1 | 10/2005 | Fraenkel et al. |
| 2006/0054783 | A1 | 3/2006 | Voronov et al. |
| 2006/0098868 | A1 | 5/2006 | Fainstain et al. |
| 2007/0052822 | A1 | 3/2007 | Fainstain et al. |

OTHER PUBLICATIONS

Hsieh, Jeff Y. F. et al., "Low-Power MPEG2 Encoder Architecture For Digital CMOS Camera," IEEE, pp. IV-301-304, 1998.

Loinaz, Marc J. et al., "A 200-mW, 3.3-V, CMOS Color Camera IC Producing 352×288 24-b Video At 30 Frames/s," IEEE Journal of Solid-State Circuits, vol. 33, No. 12, pp. 2092-2103, Dec. 1998.

Panicacci, Roger et al., "Programmable Multiresolution CMOS Active Pixel Sensor," SPIE, vol. 2654, pp. 72-79, no date.

Scheffer, Danny et al., "Random Addressable 2048×2048 Active Pixel Image Sensor," IEEE Transactions On Electron Devices, vol. 44, No. 10, pp. 1716-1720, Oct. 1997.

"Anatomy Of A Digital Camera: Image Sensors," http://www.extremetech.com/article2/0,1558, 32 pages, printed Jun. 21, 2005.

* cited by examiner $$Y_{i,j} = \sum_{u=-1}^{+1}\sum_{v=-1}^{+1} X_{i+u,j+v} * C_{u,v}$$

$$\begin{bmatrix} C_{-1,-1} & C_{0,-1} & C_{1,-1} \\ C_{-1,0} & C_{0,0} & C_{1,0} \\ C_{-1,1} & C_{0,1} & C_{1,1} \end{bmatrix} = \begin{vmatrix} 1/8 & 1/4 & 1/8 \\ 1/4 & 1/2 & 1/4 \\ 1/8 & 1/4 & 1/8 \end{vmatrix}$$

FIG. 2

LOW NOISE COLOR CORRECTION MATRIX FUNCTION IN DIGITAL IMAGE CAPTURE SYSTEMS AND METHODS

CROSS-REFERENCES TO RELATED APPLICATIONS

This application is a non-provisional of, and claims the benefit of, commonly assigned, U.S. Provisional Application No. 60/782,502, filed on Mar. 15, 2006, entitled "LOW NOISE COLOR CORRECTION MATRIX FUNCTION," the entirety of which is herein incorporated by reference for all purposes.

This application is related to the following co-pending, commonly-assigned U.S. patent applications, the entirety of each of which being herein incorporated by reference for all purposes: U.S. patent application Ser. No. 10/474,798, filed Oct. 8, 2003, entitled "CMOS IMAGER FOR CELLULAR APPLICATIONS AND METHODS OF USING SUCH"; U.S. patent application Ser. No. 10/474,275, filed Feb. 11, 2005, entitled "CMOS IMAGER FOR CELLULAR APPLICATIONS AND METHODS OF USING SUCH"; U.S. patent application Ser. No. 10/474,799, filed Oct. 8, 2003, entitled "BUILT-IN SELF TEST FOR A CMOS IMAGER"; U.S. patent application Ser. No. 10/333,942, filed Apr. 29, 2003, entitled "SINGLE CHIP CMOS IMAGE SENSOR SYSTEM WITH VIDEO COMPRESSION"; U.S. patent application Ser. No. 11/101,195, filed Apr. 6, 2005, entitled "METHODS AND SYSTEMS FOR ANTI SHADING CORRECTION IN IMAGE SENSORS"; U.S. patent application Ser. No. 11/107,387, filed Apr. 14, 2005, entitled "SYSTEMS AND METHODS FOR CORRECTING GREEN DISPARITY IN IMAGER SENSORS"; U.S. patent application Ser. No. 11/223,758, filed Sep. 9, 2005, entitled "IMAGE FLICKER COMPENSATION SYSTEM AND METHOD," which is a non-provisional, and claims the benefit, of U.S. Provisional Application No. 60/609,195, filed Sep. 9, 2004, entitled "IMAGER FLICKER COMPENSATION"; U.S. patent application Ser. No. 11/467,044, filed Aug. 24, 2006, entitled "SMEAR CORRECTION IN A DIGITAL CAMERA," which is a non-provisional, and claims the benefit, of U.S. Provisional Application No. 60/711,156, filed Aug. 24, 2005, entitled "METHODS AND APPARATUS FOR SMEAR CORRECTION IN A DIGITAL CAMERA; U.S. patent application Ser. No. 11/467,044, filed Aug. 24, 2006, entitled "SMEAR CORRECTION IN A DIGITAL CAMERA," which is a non-provisional, and claims the benefit, of U.S. Provisional Application No. 60/711,156, filed Aug. 24, 2005, entitled "METHODS AND APPARATUS FOR SMEAR CORRECTION IN A DIGITAL CAMERA; U.S. patent application Ser. No. 11/674,719, filed Feb. 14, 2007, entitled "POST CAPTURE IMAGE QUALITY ASSESSMENT," which is a non-provisional, and claims the benefit, of U.S. Provisional Application No. 60/773,400, filed on Feb. 14, 2006, entitled "POST CAPTURE IMAGE QUALITY ASSESSMENT; and U.S. patent application Ser. No. 11/683,084, filed Mar. 7, 2007, entitled "LOW NOISE GAMMA FUNCTION IN DIGITAL IMAGE CAPTURE SYSTEMS AND METHODS," which is a non-provisional, and claims the benefit, of U.S. Provisional Application No. 60/780,130, filed on Mar. 7, 2006, entitled "LOW NOISE GAMMA FUNCTION."

FIELD OF THE INVENTION

Embodiments of the present invention relate generally to image capture. More specifically, embodiments of the invention relate to systems, circuits, and methods for low noise image signal processing.

BACKGROUND OF THE INVENTION

Color correction is usually applied to captured images to correct the color by multiplying a 3×3 coefficient matrix by the R,G,B vector component of pixels received from an image sensor. Mathematically:

$$\begin{bmatrix} R' \\ G' \\ B' \end{bmatrix} = \begin{bmatrix} C_{1,1} & C_{1,2} & C_{1,3} \\ C_{2,1} & C_{2,2} & C_{2,3} \\ C_{3,1} & C_{3,2} & C_{3,3} \end{bmatrix} \cdot \begin{bmatrix} R \\ G \\ B \end{bmatrix}$$

Such color correction is done for the purpose of correcting for physical phenomena, for example, non-ideal color separation by the image sensor. In general, the sum of $C_{i,j}$ elements in each row is 1, but the values of the elements $C_{i,j}$ often include negative and positive numbers having an absolute value greater than 1. Simple mathematical analysis will show that error in the elements that are larger in absolute value than 1 result in error amplification at the output. The result is that the application the color correction matrix increases noise in the image.

BRIEF SUMMARY OF THE INVENTION

Embodiments of the present invention provide an image processing system. The system includes a filtering arrangement configured to receive incoming pixel information and filter at least a first portion of the information to thereby pass a second portion of the information for further processing. The system also includes circuitry configured to apply a first color correction function to the incoming pixel information to thereby produce a modified first portion and circuitry configured to apply a second color correction function to the second portion to thereby produce a modified second portion. The system further includes an adder configured to combine the modified first portion to the modified second portion. In some embodiments, the system also includes delay circuitry configured to introduce a processing delay to thereby delay processing of the first portion prior to combining the modified first portion to the modified second portion. The filtering arrangement may be a spatial low-pass filter. The spatial low pass filter may include a multiplication matrix function. The multiplication matrix function may be applied to a 3×3 pixel region. The spatial low pass filter may be an infinite impulse response filter. The image processing system may be a digital still camera, a camera phone, a movie camera, or the like. The first color correction function may include a unity matrix and may be applied to luminance information. The second color correction function may be a zero mean matrix and may be applied to chrominance information.

Other embodiments provide an image processing system. The system includes means for receiving image information from an image sensor; means for segmenting the image information into a first portion and a second portion; means for applying a first color correction function to the image information to thereby produce a modified first portion; means for applying a second color correction function to the second portion to thereby produce a modified second portion; and means for combining the modified first portion to the modified second portion to thereby produce final image information.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 depicts a spatial low pass filter function that may be used in embodiments of the present invention.

DETAILED DESCRIPTION OF THE INVENTION

Figure 1:
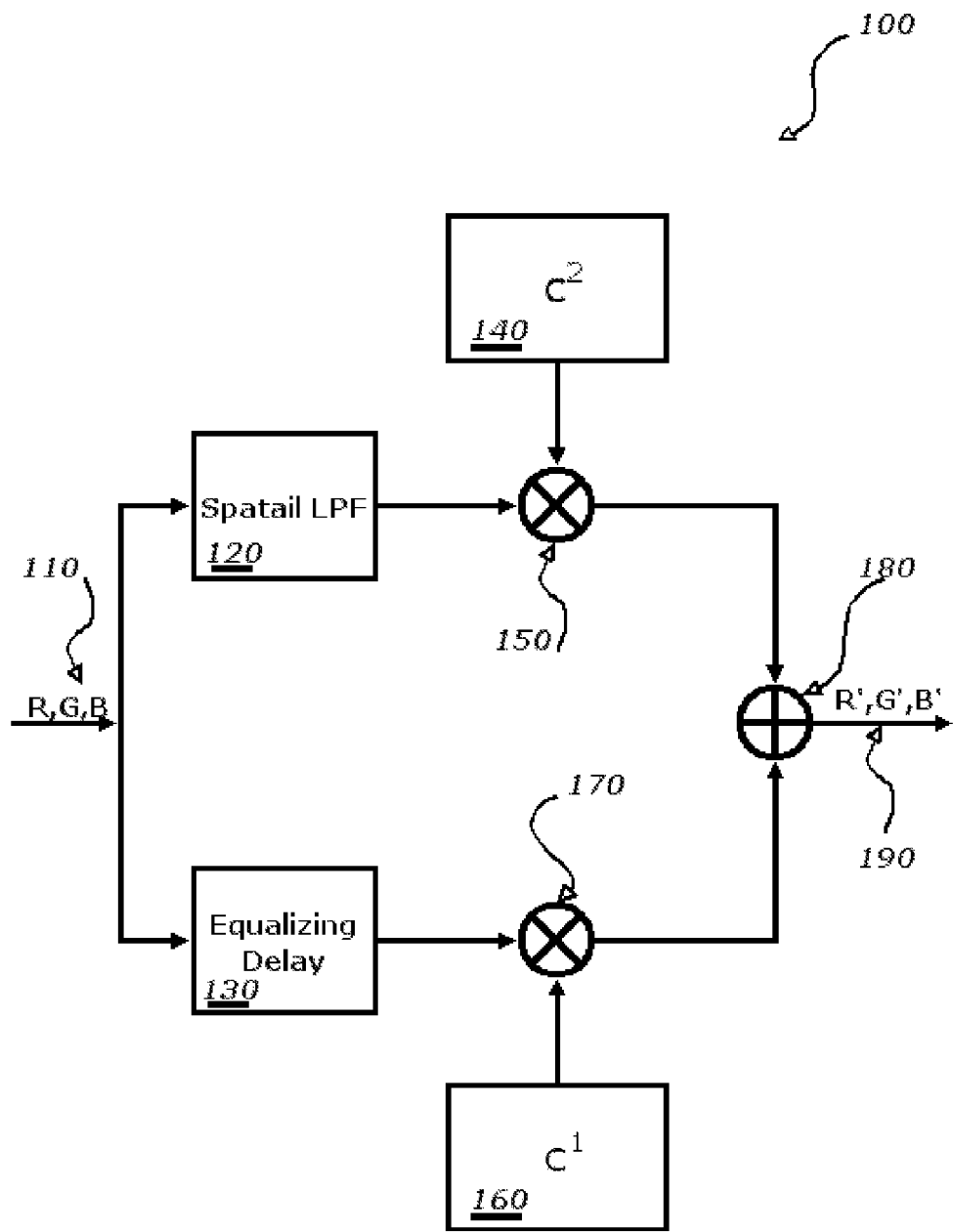
FIG. 1 depicts a circuit that implements a color correction function according to embodiments of the invention.

Embodiments of the present invention relate to capturing images. In order to provide a context for describing embodiments of the present invention, embodiments of the invention will be described herein with reference to digital image capture. Those skilled in the art will appreciate, however, that other embodiments are possible. The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention relate to systems, circuits and methods for applying a color correction function to output signals generated by pixels of an image sensing array. The color correction function is applied as a matrix function. In exemplary embodiments, the color correction matrix is divided into two matrices: a first matrix that is diagonal; and a second matrix that is equal to the required color correction matrix minus the diagonal matrix. The first matrix is them multiplied by a low pass version of the incoming pixel stream then added to the second matrix multiplied by the original pixel stream. The result is a color corrected pixel stream in which sharpness perception is retained and noise amplification is minimized.

In order to implement a low noise color correction function, a color correction matrix C is separated into two parts: $C^1$, which does not amplify the noise; and $C^2$, which could amplify the noise, but which can be applied to a low pass version of the incoming pixel signal without perceptible loss of detail. Hence, $C^1+C^2=C$. (Note: in the present context, the superscript notations $C^1$ and $C^2$ specify an index rather than power).

In some embodiments, $C^1$ is a unity matrix, responsible for the luminance information, while $C^2$ is a zero-mean matrix, responsible for the chrominance information. The matrices are defined so that the effect of using a low pass version of the pixel stream for $C^2$ degrades only the chrominance spatial resolution, while the application of $C^1$ on the original pixel stream leaves the luminance resolution unharmed. This is amenable to the human eye, which looks for contrast in the luminance, and expects smooth changes in the chrominance.

In a specific embodiment, the color correction matrix $$C = \begin{bmatrix} C_{1,1} & C_{1,2} & C_{1,3} \\ C_{2,1} & C_{2,2} & C_{2,3} \\ C_{3,1} & C_{3,2} & C_{3,3} \end{bmatrix}$$

is replaced with $$C^1 = \begin{bmatrix} 1 & 0 & 0 \\ 0 & 1 & 0 \\ 0 & 0 & 1 \end{bmatrix} \text{ and } C^2 = \begin{bmatrix} C_{1,1}-1 & C_{1,2} & C_{1,3} \\ C_{2,1} & C_{2,2}-1 & C_{2,3} \\ C_{3,1} & C_{3,2} & C_{3,3}-1 \end{bmatrix},$$

such that $C^1+C^2=C$. Note that other matrices are possible.

Having described embodiments of the present invention generally, attention is directed to FIG. 1, which depicts an exemplary functional block diagram of a color correction circuit 100, according to embodiments of the present invention. Those skilled in the art will appreciate that the circuit 100 is merely exemplary of a number of possible circuit embodiments.

Input pixel information enters the circuit at 110 and is applied to a spatial low-pass filter 120. In some embodiments the spatial low pass filter 120 is a multiplication of the 3×3 pixels around a current pixel by elements of a constant 3×3 matrix. An exemplary low pass filter matrix is depicted in FIG. 2. In other embodiments, different matrices may be used, with different sizes of the environment. In yet other embodiments, an infinite impulse response (IIR) filter may be used.

Output from the spatial low pass filter 120 is then asserted at a first input port of a matrix multiplier 150, which multiplies the low pass pixels by matrix $C^2$ 140, received at a second input port of the matrix multiplier 150.

The input pixel information also is applied to a second matrix multiplier 170. The matrix multiplier multiplies this signal by matrix $C^1$ 160.

Because processing through the spatial low pass filter 120 and the matrix multiplier 150 may delay one signal with respect to the other, processing through the second path may be delayed with the addition of an equalizing delay 130. The delay introduced by the equalizing delay 130 equals the delay through blocks 120 and 150, minus the delay through block 170, when the latter is non-zero. It should be noted that, in embodiments where matrix $C^1$ is a diagonal matrix, blocks 160 and 170 are, in effect, a zero-delay transfer of the inputs to the outputs, and can be eliminated.

The result of the two multiplications is then summed by an adder 180 to generate a color-matrix-corrected pixel stream R', G', B' 190.

Having described an exemplary circuit embodiment, the ensuing description relates to an exemplary low-noise color correction method that may be implemented in the circuit 100 of FIG. 1. The method includes:

a) Separating the color correction matrix into noise-sensitive and noise insensitive parts. The noise-sensitive matrix may be a zero mean matrix relating to chrominance information; the noise insensitive matrix may be a unity matrix relating to luminance information.

b) Low pass filtering input image information;

c) Multiplying the noise sensitive matrix by the low pass filtered information;

d) Multiplying the noise insensitive matrix by the input image information;

e) Adding the outputs of the two multipliers to produce a low noise color-corrected pixel stream.

f) Separation of the matrix as in a), where the first matrix is zero mean matrix, responsible for the chrominance information, and the latter is a unity matrix, responsible for the luminance information.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. An image processing system, comprising:

a filtering arrangement configured to receive incoming pixel information and filter at least a first portion of the information to thereby pass a second portion of the information for further processing;

circuitry configured to apply a first color correction function to the incoming pixel information to thereby produce a modified first portion;

circuitry configured to apply a second color correction function to the second portion to thereby produce a modified second portion; and an adder configured to combine the modified first portion to the modified second portion, wherein the second color correction function includes a zero mean matrix and is applied to chrominance information.

2. The image processing system of claim 1, further comprising delay circuitry configured to introduce a processing delay to thereby delay processing of the first portion prior to combining the modified first portion to the modified second portion.

3. The image processing system of claim 1, wherein the filtering arrangement comprises a spatial low-pass filter.

4. The image processing system of claim 3, wherein the spatial low pass filter comprises a multiplication matrix function.

5. The image processing system of claim 4, wherein the multiplication matrix function is applied to a 3.times.3 pixel region.

6. The image processing system of claim 1, wherein the spatial low pass filter comprises an infinite impulse response filter.

7. The image processing system of claim 1, wherein the image processing system is comprised by a selection from the group consisting of: digital still camera, camera phone, and movie camera.

8. The image processing system of claim 1, wherein the first color correction function comprises a unity matrix and is applied to luminance information.

9. An image processing system, comprising:

means for receiving image information from an image sensor; means for segmenting the image information into a first portion and a second portion;

means for applying a first color correction function to the image information to thereby produce a modified first portion;

means for applying a second color correction function to the second portion to thereby produce a modified second portion; and means for combining the modified first portion to the modified second portion to thereby produce final image information, wherein the second color correction function includes a zero mean matrix and is applied to chrominance information.

10. The system of claim 9, further comprising means for introducing a processing delay to thereby delay processing of the first portion prior to combining the modified second portion to the modified first portion.

11. The system of claim 10, wherein the spatial low pass filter comprises a multiplication matrix function.

12. The system of claim 11, wherein the multiplication matrix function is applied to a 3.times.3 pixel region.

13. The system of claim 9, wherein the means for segmenting the image information into a first portion and a second portion comprises a spatial low-pass filter.

14. The system of claim 9, wherein the means for segmenting the image information into a first portion and a second portion comprises an infinite impulse response-filter.

15. The system of claim 9, wherein the image processing system is comprised by a selection from the group consisting of: digital still camera, camera phone, and movie camera.

16. The system of claim 9, wherein the first color correction function comprises a unity matrix and is applied to luminance information.

* * * * *